(12) United States Patent
Provenza

(10) Patent No.: US 10,710,721 B2
(45) Date of Patent: Jul. 14, 2020

(54) AIRBORNE STORE EJECTION USING SELECTABLE FORCE GAS GENERATOR

(71) Applicant: GOVERMENT OF THE UNITED STATES AS REPRESENTED BY THE SECRETARY OF THE AIR FORCE, Wright-Patterson AFB, OH (US)

(72) Inventor: Jerry Provenza, Niceville, FL (US)

(73) Assignee: United States of America as represented by the Secretary of the Air Force OH (US)

( * ) Notice: Subject to any disclaimer, the term of this patent is extended or adjusted under 35 U.S.C. 154(b) by 0 days.

(21) Appl. No.: 16/190,740

(22) Filed: Nov. 14, 2018

(65) Prior Publication Data

US 2020/0148356 A1 May 14, 2020

(51) Int. Cl.
*B64D 1/04* (2006.01)

(52) U.S. Cl.
CPC ..................... *B64D 1/04* (2013.01)

(58) Field of Classification Search
CPC ... B64D 1/00; B64D 1/02; B64D 1/04; B64D 1/06; B64D 1/08; B64D 1/12
USPC .............................. 89/1.51, 1.54, 1.56, 1.57
See application file for complete search history.

(56) References Cited

U.S. PATENT DOCUMENTS

| | | | | |
|---|---|---|---|---|
| 5,029,776 A * | 7/1991 | Jakubowski | ............. | B64D 1/06 244/137.4 |
| 5,070,760 A * | 12/1991 | Marshall | .................. | B64D 1/04 244/137.4 |
| 5,487,322 A * | 1/1996 | Rhodes | ..................... | B64D 1/04 244/137.4 |
| 5,583,312 A * | 12/1996 | Jakubowski, Jr. | ........ | B64D 1/06 244/137.4 |
| 6,892,985 B2 * | 5/2005 | Jakubowski, Jr. | ........ | B64D 1/02 244/137.4 |
| 7,954,765 B2 * | 6/2011 | Jakubowski, Jr. | ........ | B64D 1/04 137/625.5 |
| 8,127,656 B1 * | 3/2012 | Yuan | ........................ | B64D 1/06 102/382 |
| 2004/0016848 A1 * | 1/2004 | Jakubowski, Jr. | ........ | B64D 1/02 244/137.4 |
| 2013/0047835 A1 * | 2/2013 | Tobias | ...................... | F15B 1/26 92/61 |

* cited by examiner

*Primary Examiner* — Bret Hayes
(74) *Attorney, Agent, or Firm* — AFMCLD/JAZ; David Franklin

(57) ABSTRACT

An airborne store support assembly includes an ejector housing assembly that receives a fluid-actuated ejector piston. Extension of the piston pushes apart an airborne store from an aircraft for separation after release. A selectable force gas generator (SFGG) includes a total number of more than one gas-generating unit in fluid communication with the ejector housing assembly to actuate the fluid-actuated ejector piston with a selected amount of force. A communication interface in communication with the SFGG supplies at least one firing signal that causes a selected subset of the more than one gas-generating unit that corresponds to the selected amount of force that is dynamically determined by a controller based on flight parameters of at least one of an attitude, a rate of motion, and a rate of acceleration of the aircraft.

19 Claims, 4 Drawing Sheets

AIRBORNE STORE EJECTION USING SELECTABLE FORCE GAS GENERATOR

ORIGIN OF THE INVENTION

The invention described herein was made by employees of the United States Government and may be manufactured and used by or for the Government of the United States of America for governmental purposes without the payment of any royalties thereon or therefore.

This application claims the benefit of priority under 35 U.S.C. § 119(e) to U.S. Provisional Application Ser. No. 62/724,325 entitled "Airborne Store Ejection Using Selectable Force Gas Generator", filed 29 Sep. 2018, the content of which is incorporated herein by reference in its entirety.

BACKGROUND

1. Technical Field

The present disclosure generally relates to ejector weapon suspension assemblies, and more particularly to ejector weapon suspension assemblies that actuate using electrically-initiated gas-generating charges.

2. Description of the Related Art

Conventional bomb rack systems have a preset ejection force that can only be selected manually on the ground and prior to flight. Rapid changes in speed, attitude, pitch attitude, pitch rate, sensed gravitational forces, etc., however, can cause a weapon ejected with a preset ejection force to have insufficient separation from the aircraft or to tumble. This restricts the delivering aircraft to a limited operational envelope wherein the preset ejection force achieves an effective delivery of the weapon. In addition, conventional bomb rack system are costly, heavy and reusable which require regular inspections and maintenance. In addition, they are subject to fatigue, material corrosion, and other long term effects.

BRIEF SUMMARY

In one aspect, the present disclosure provides an airborne store support assembly includes a first ejector housing assembly coupled to a selected one of: (i) an airborne store; and (i) an aircraft. The airborne store support assembly further includes a first fluid-actuated ejector piston received for movement in the first ejector housing assembly. The first fluid-actuated ejector piston has a distal end abutting for contact the other one of: (i) the airborne store; and (ii) the aircraft. A first selectable force gas generator (SFGG) includes a total number of more than one gas-generating unit in fluid communication with the first ejector housing assembly. The SFGG actuates the first fluid-actuated ejector piston with a first selected amount of force. An initiator is in communication with the first SFGG. The initiator supplies at least one firing signal that causes a first selected subset of the more than one gas-generating unit that corresponds to the first selected amount of force. A signal switching matrix selectively communicatively couples the firing signal from the initiator to one or more of the gas-generating units. A device interface is coupled to at least one sensor, the initiator, and the first signal switching matrix. The at least one sensor dynamically detects one or more flight parameters of at least one of: (i) an attitude; (ii) a rate of motion; and (iii) a rate of acceleration of the aircraft. A controller is in communication with the initiator, first signal switching matrix, and the sensor via the device interface. The controller dynamically determines the first selected subset of the more than one gas-generating unit based at least in part on the one or more flight parameters.

In another aspect, the present disclosure provides a SFGG comprising (i) a plurality of gas-generating propellant cells; (ii) an SFGG housing attachable to an ejector housing of an airborne store support assembly of an aircraft; (iii) a honeycombed lattice structure contained by the SFGG housing that maintain the plurality of electrically-fired initiators in operable contact with the plurality of gas-generating propellant cells; (iv) one or pneumatic conduit that originate with each one of the plurality of gas-generating propellant cells and form a converged output conduit connectable for fluid communication with the respective ejector housing; and (v) a first signal switching matrix that selectively communicatively couples the firing signal from the initiator to one or more of the gas-generating units.

In another aspect, the present disclosure provides a method for dynamically providing an amount of force to ejecting an airborne store from an aircraft. The method includes dynamically detecting one or more flight parameters of at least one of: (i) an attitude; (ii) a rate of motion; and (iii) a rate of acceleration of an aircraft. In response to receiving at least one firing signal, the method includes: (i) determining a first selected amount of force required at a first fluid-actuated ejector piston, received for movement in a first ejector housing, to separate an airborne store from the aircraft during release that compensates for the dynamically detected one or more flight parameters; and (ii) initiating a first selected subset that correspond to the first selected amount of force of a number of gas-generating units of a first selectable force gas generator (SFGG). The initiated first selected subset of gas-generating units actuates the first fluid-actuated ejector piston to cause a separation between the airborne store and the aircraft.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
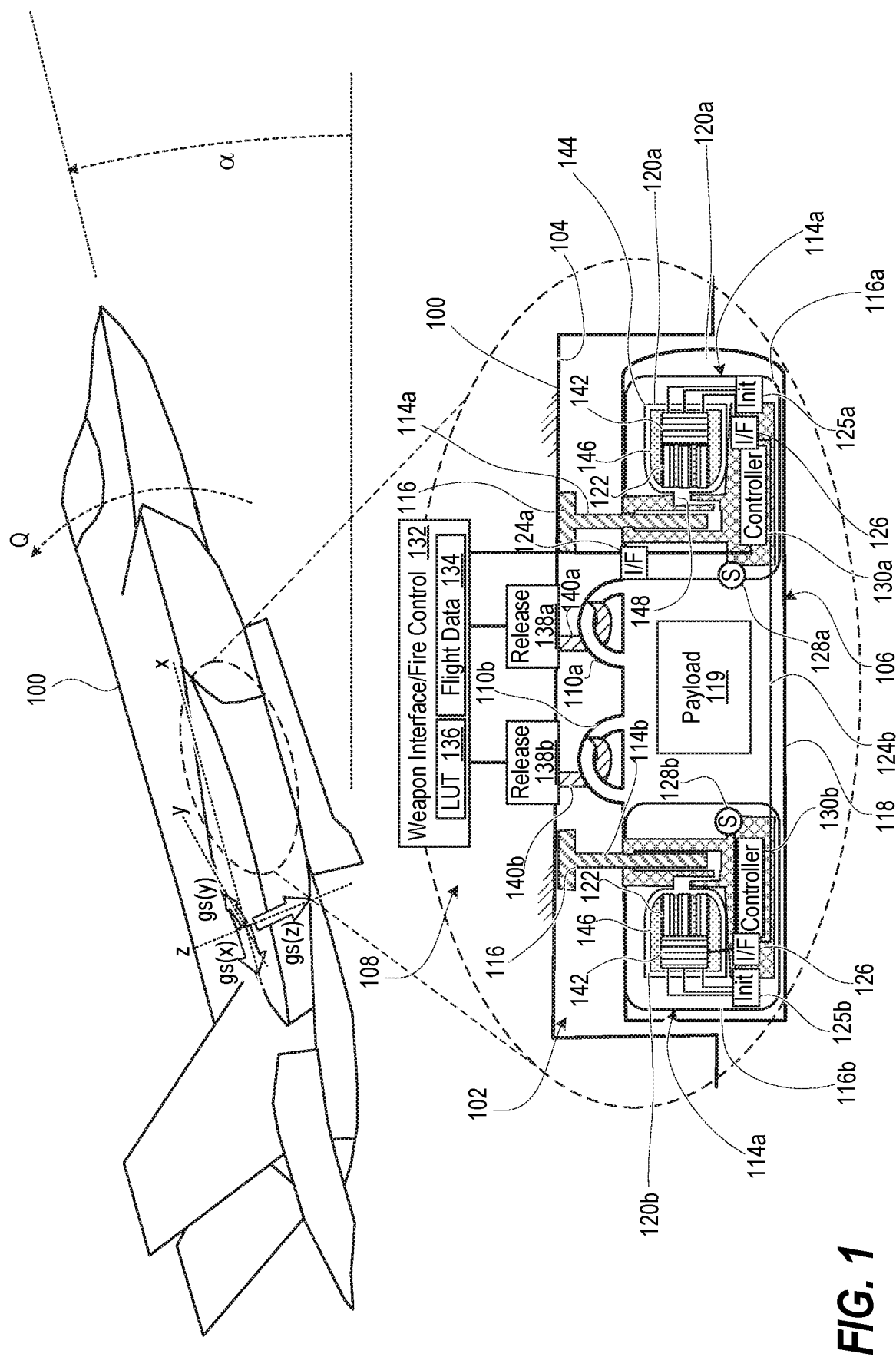
FIG. 1 is a side view of an aircraft annotated with flight parameters and with a detailed simplified functional diagram of an airborne store ejection system, according to one or more embodiments.

An airborne store support assembly includes a fluid-actuated ejector piston position a supported airborne store relative to an aircraft and is received for movement in an ejector housing assembly. A selectable force gas generator (SFGG) includes a total number of more than one gas-generating unit in fluid communication with a first ejector housing assembly to actuate the fluid-actuated ejector piston with a selected amount of force. An initiator is in communication with the SFGG and supplies at least one firing signal that causes a selected subset of the more than one gas-generating unit. A first signal switching matrix selectively communicatively couples a firing signal from the initiator to one or more of the gas-generating units. The selected subset corresponds to the selected amount of force that is dynamically determined by a controller based on flight parameters of at least one of an attitude, a rate of motion, and a rate of acceleration of the aircraft.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment", "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 2:
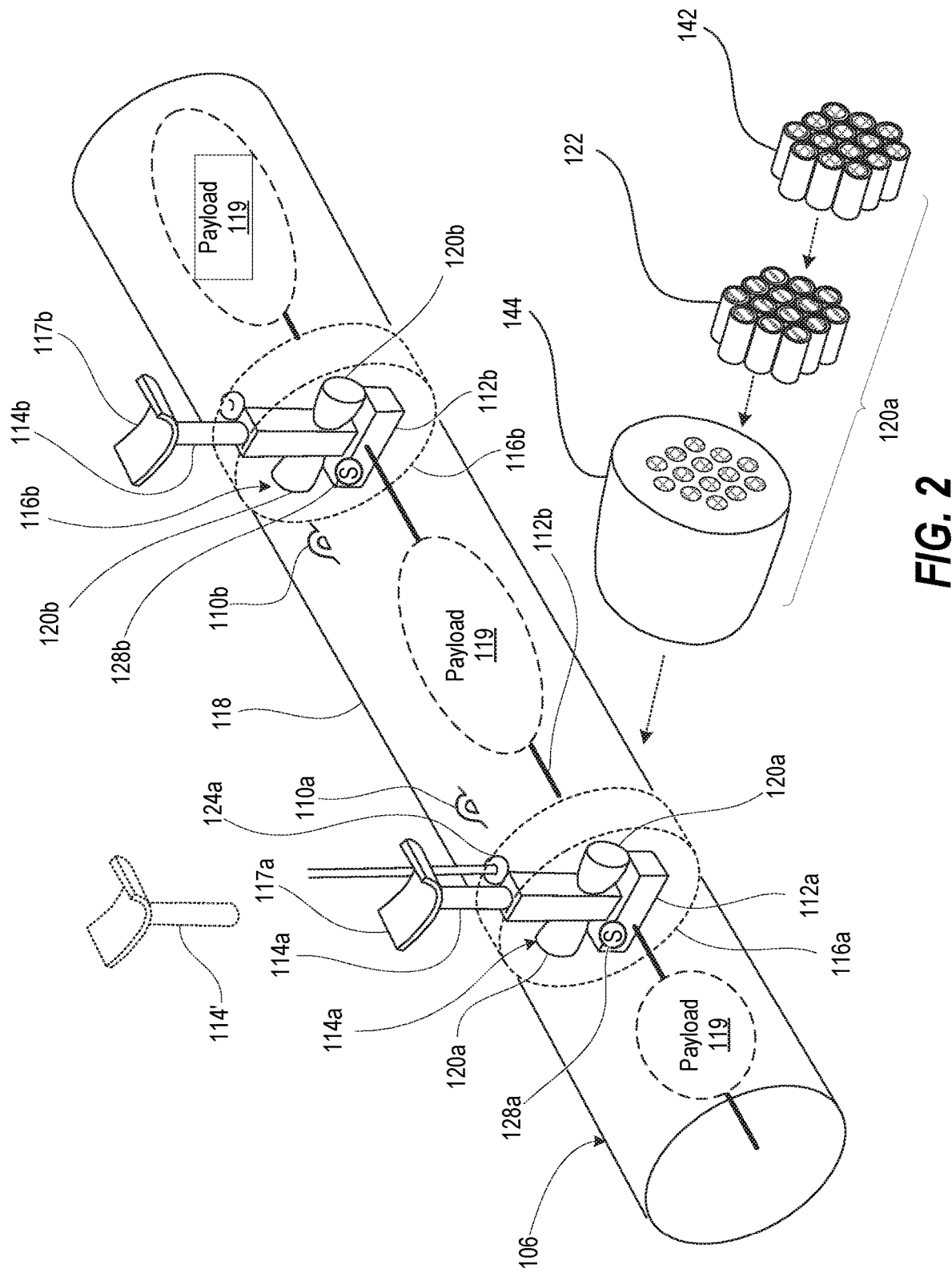
FIG. 2 is an isometric diagrammatic view of airborne store, according to one or more embodiments.

FIG. 1 is a side view of aircraft 100 annotated with flight parameters and with a detailed simplified functional diagram of airborne store ejection system 102, according to one or more embodiments. FIG. 2 is an isometric diagrammatic view of airborne store 106. With particular reference to FIG. 1, aircraft 100 has airframe 104 that is subject to aerodynamic movements comprising changes in attitude, rate of motion and rate of acceleration. The aerodynamic movements are represented by (i) sensed gravitational acceleration along aircraft body longitudinal x-axis ($gs(x)$); (ii) sensed gravitational acceleration along aircraft body lateral y-axis ($gs(y)$); (iii) sensed gravitational acceleration along aircraft body vertical z-axis ($gs(z)$); (v) pitch rate (Q); and (vi) angle of attack ($\alpha$). Other flight parameters that can affect airborne store deployment can include, but are not limited to: (vii) static temperature (T0); (viii) total temperature; (ix) altitude; (x) flight path angle ($\gamma$); (xi) barometric pressure; (xii) wind speed; (xiii) wind direction; (xiv) velocity; (xv) pitching moment (M); (xvi) rolling moment (L); (xvii) yawing moment (N); (xviii) local horizon reference plane; (xix) pitch attitude ($\theta$); (xx) roll attitude ($\phi$)); (xxi) yaw rate (r); and (xxii) angle sideslip ($\beta$).

An airborne store 106 is suspended from the airframe 104 of the aircraft 100 by a store suspension and delivery system (SSDS) 108 that can include: (i) components integral to the airborne store 106; (ii) components integral to the aircraft 100; and (ii) airborne store support components mountable or engageable between the aircraft 100 and airborne store 106. For example, airborne store 106 can include fore and aft suspension lugs 110a, 110b, one or more communication interfaces 112a, 112b, and fore and aft airborne store ejection subsystems 114a, 114b. Each airborne store ejection subsystem 114a, 114b includes an ejector bulkhead 116a, 116b that provides structural attachment to a cylinder wall 118 of the airborne store 106 as well as an internal support structures (not shown).

Airborne store 106 can be various types of payloads 119 that are carried externally or within a weapons bay of an aircraft that require the ability to be released during flight without contacting the aircraft 100. Release or firing can be operationally required, such as releasing a munition or airborne deployable payload. Release can be performed in response to needing to reduce aerodynamic drag, such as dropping fuel tanks in preparation for air-to-air combat or an emergency landing. Examples of munitions include canisters that dispense bomblets, flare parachutes, etc. Munitions include torpedoes, bombs, rockets, missiles, reconnaissance drones, target drones, etc. Airborne stores can contain emergency supplies for ground personnel. In one or more embodiments, airborne store 106 has an aerodynamic shape to depart ballistically from the aircraft 100 after release and ejection. SSDS 108 imparts ejection force(s) that separate the airborne store 106 from the aircraft 100 with stabilized motions and accelerations relative to the aircraft 100 to avoid tumbling or impact after release.

Airborne store support assembly 102 includes first and second ejector bulkheads 110a, 110b. For example, first ejector bulkhead 110a can be oriented longitudinally in front of second ejector bulkhead 110b. First ejector bulkhead 110a includes first ejector housing assembly 112a. First fluid-actuated ejector piston 114a is received for movement in first ejector housing assembly 112a. In one or more embodiment, first fluid-actuated ejector piston 114a terminates with contact structure 117a to push against another structure to position supported airborne store 106 relative to aircraft 100. First SFGG 120a includes a total number of more than one gas-generating unit 122 in fluid communication with first ejector housing assembly 112a. First SFGG 120a actuates the first fluid-actuated ejector piston 114a with a first selected amount of force. First communication interface 124a is in communication with the second SFGG 120a. First communication interface 124a supplies at least one firing signal generated by an initiator 125a that causes a second selected subset of the more than one gas-generating unit 122 that corresponds to the second selected amount of force. Device interface 126a is coupled to at least one sensor 128a that dynamically detects one or more flight parameters of at least one of: (i) an attitude; (ii) a rate of motion; and (iii) a rate of acceleration of the aircraft. A controller 130a is in communication with the second communication interface 124a and the device interface 126a. The controller 130a dynamically determines the second selected subset of the more than one gas-generating unit 122 based at least in part on the one or more flight parameters.

Similarly, second ejector bulkhead 110b includes second ejector housing assembly 112b. Second fluid-actuated ejector piston 114b is received for movement in second ejector housing assembly 112b. In one or more embodiment, second fluid-actuated ejector piston 114b terminates with contact structure 117b to push against another structure to position supported airborne store 106 relative to aircraft 100. Second SFGG 120b includes a total number of more than one gas-generating unit 122 in fluid communication with second ejector housing assembly 112b. Second SFGG 120a actuates the second fluid-actuated ejector piston 114b with a second selected amount of force. Second communication interface 124b is in communication with the second SFGG 120b. The second communication interface 124b supplies at least one firing signal generated by an initiator 125b that causes a second selected subset of the more than one gas-generating unit 122 that corresponds to the second selected amount of force. Device interface 126b is coupled to at least one sensor 128b that dynamically detects one or more flight parameters of at least one of: (i) an attitude; (ii) a rate of motion; and (iii) a rate of acceleration of the aircraft. A controller 130b is in communication with the second communication interface 124b, such as an intra-store communication bus, and the device interface 126b. The controller 130b dynamically determines the second selected subset of the more than one gas-generating unit 122 based at least in part on the one or more flight parameters.

For clarity, release and ejection and other functionality of the SSDS 108 is distributed between higher level functions performed by a weapon interface/fire control system 132 of aircraft 100 and one or more controllers 130a, 130b that control SFGGs 120a, 120b. For example, weapon interface/fire control system 132 can confirm that release is occurring before triggering ejection, instructing controllers 130a, 130b as to what respective motion profile is to be executed. In an exemplary embodiment, weapon interface/fire control system 132 maintains flight data 134 that is used to find appropriate motion profiles in a lookup table (LUT) 136. In one or more embodiments, controllers 130a, 130b are responsible for determining what motion profile is appropriate based on locally sensed flight data and settings specific for a type of airborne store 106 that is being carried. In one or more embodiments, the illustrative functions discussed herein are performed by a unified controller. Weapon interface/fire control system 132 actuate release mechanisms 138a, 138b that unlatch respective support hooks 140a, 140b from each lug 110a, 110b, allowing separation of airborne store 106 from aircraft 100.

In another aspect, SFGG 120a, 120b can provide a replaceable assembly of (i) a plurality of gas-generating propellant cells 122; (ii) a signal switching matrix 142 that can be dynamically programmed to selectably trigger one or more gas-generating propellant cells 122; (ii) an SFGG housing 144 attachable to a respective ejector housing assembly 112a, 112b; (iii) a honeycombed lattice structure 146 contained by the SFGG housing 144 that maintain the signal switching matrix 142 in operable contact with the plurality of gas-generating propellant cells 122; (iv) one or pneumatic conduits 148 that originate with each one of the plurality of gas-generating propellant cells 122.

FIG. 2 illustrates that each airborne store ejection subsystem 114a, 114b can have more than one SFGG 120a, 120b, such as to provide greater amounts of selectable gas or to provide redundancy. In one or more embodiments, ejection pistons 114a, 114b and contact structures 117a, 117b can remain with aircraft 100 as released ejection piston 114' with respective ejection housing assemblies 112a, 112b pushing away from ejection pistons 114a, 114b.

Figure 3:
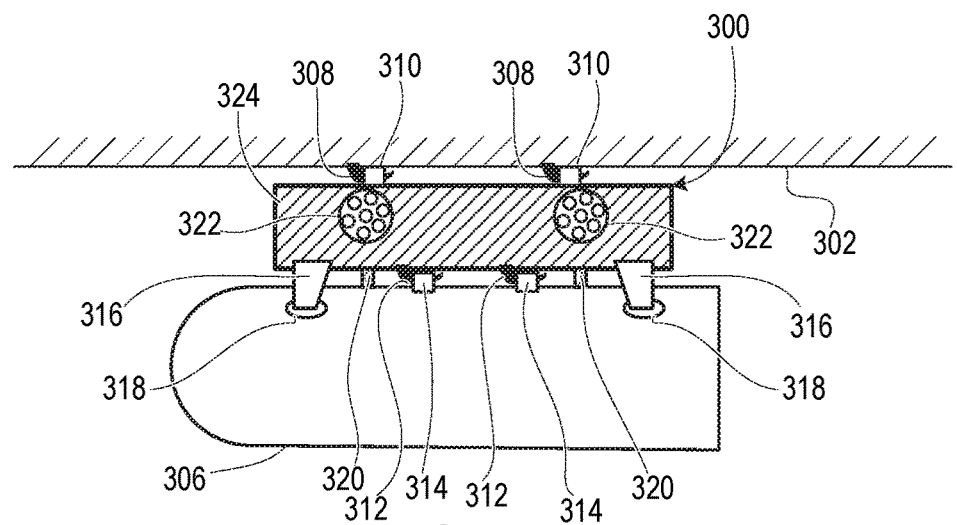
FIG. 3 is a side view of a bomb rack attached between an aircraft and a suspended airborne store, according to one or more embodiments.

FIG. 3 is a side view of a bomb rack 300 attached between an aircraft 302 and a suspended airborne store 306. Aircraft 302 include an aircraft suspension apparatus 308 engageably attached to lugs 310 on bomb rack 300. Bomb rack 300 in turn include a suspension apparatus 312 engageably attached to lugs 314 on airborne store 306. Bomb rack 300 includes sway braces 316 having sway pads 318 that contact and steady airborne store 306. Ejector pistons 320 extend downward from bomb rack 300 to contact airborne store 306. SFGGs 322 are mounted to rack frame 324 of bomb rack 300 to generate a selected amount of force to eject airborne store 306 away from bomb rack 300 and aircraft 302 to achieve separation.

Figure 4:
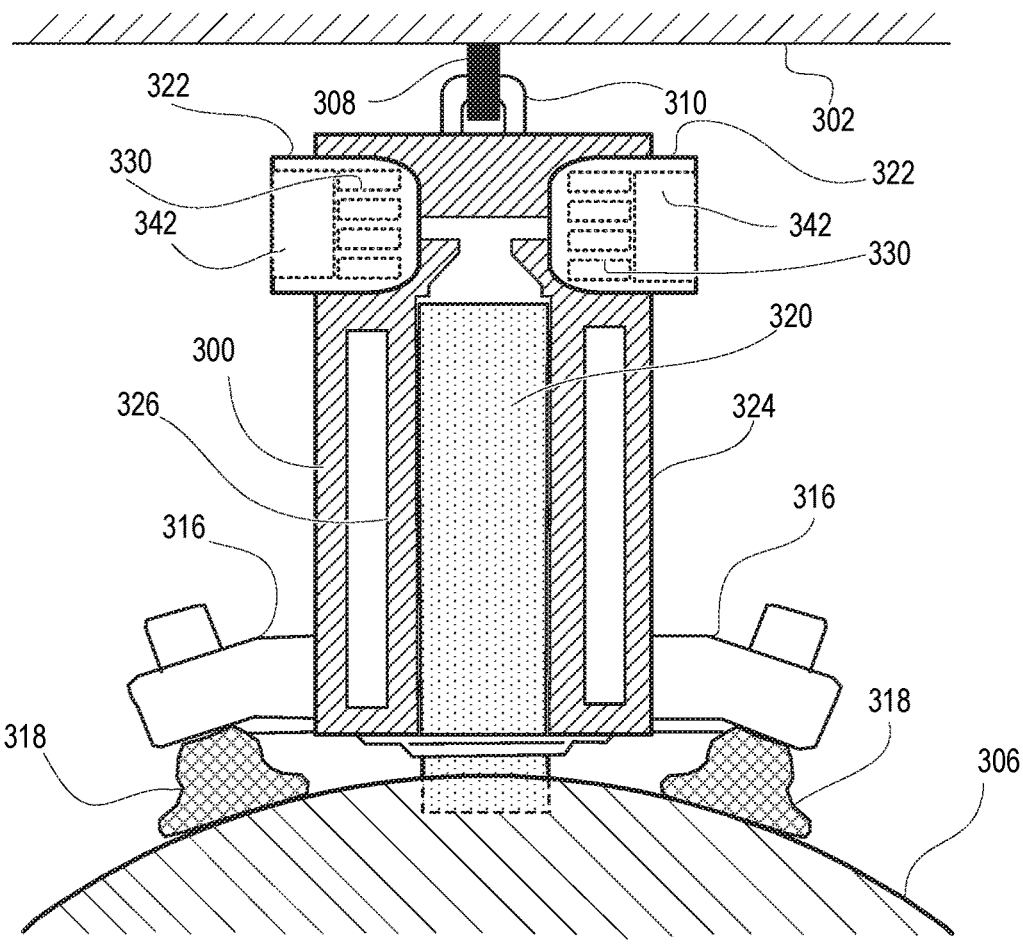
FIG. 4 is a front cross-sectional view of the bomb rack attached between aircraft and suspended airborne store, according to one or more embodiments.

FIG. 4 is a front cross-sectional view of bomb rack 300 attached between aircraft 302 and suspended airborne store 306. Ejector piston 320 is received upward into ejection housing 326 of rack frame 324. SFGGs 322 include signal switching matrix 342 in operable contact with the plurality of gas-generating propellant cells 330 that generate gas that pressurizes a piston chamber 332 to downwardly extend ejector piston 320 to eject airborne store 306.

In one or more embodiments, bomb rack 300 is a missionized assembly that is mounted onto aircraft 302 as required. In one or more embodiments, bomb rack 300 is one of a number of types of bomb racks and other store support adapters that can be selected for mounting. In one or more embodiments, a rack frame is integral to, or otherwise attached to, a structural frame of aircraft 302.

Figure 5:
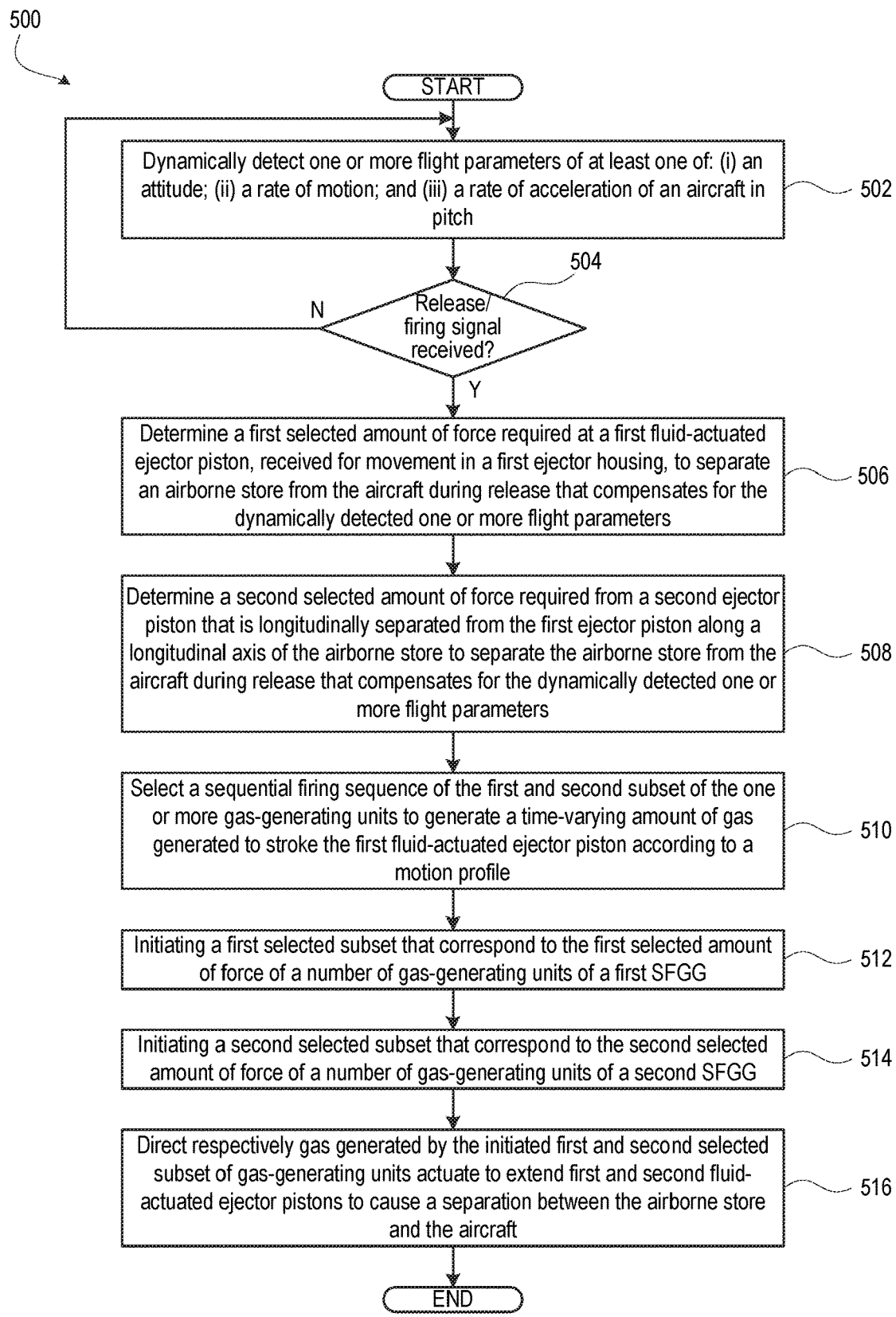
FIG. 5 is a flow diagram of a method for dynamically providing an amount of force to ejecting an airborne store from an aircraft, according to one or more embodiments

FIG. 5 is a flow diagram of a method 500 for dynamically providing an amount of force to ejecting an airborne store from an aircraft. In one or more embodiments, method 500 includes dynamically detecting one or more flight parameters of at least one of: (i) an attitude; (ii) a rate of motion; and (iii) a rate of acceleration of an aircraft in pitch (block 502). In one or more embodiment, the one or more flight parameters can include: (i) sensed gravitational acceleration along aircraft body longitudinal x-axis (gs(x)); (ii) sensed gravitational acceleration along aircraft body lateral y-axis (gs(y)); (iii) sensed gravitational acceleration along aircraft body vertical z-axis (gs(z)); (iv) static temperature (T0); (v) pitch rate (Q); and (vi) angle of attack.

A determination is made as to whether a release or firing signal is received (decision block 504). In one or more embodiments, successful release can be a condition precedent for triggering ejection. In response to determining that a release or firing signal is not received, method 500 returns to block 502 to continue monitoring flight parameters. In response to determining that a release or firing signal is received, method 500 includes determining a first selected amount of force required at a first fluid-actuated ejector piston, received for movement in a first ejector housing, to separate an airborne store from the aircraft during release that compensates for the dynamically detected one or more flight parameters (block 506). In one or more embodiments, method 500 includes determining a second selected amount of force required from a second ejector piston that is longitudinally separated from the first ejector piston along a longitudinal axis of the airborne store to separate the airborne store from the aircraft during release that compensates for the dynamically detected one or more flight parameters (block 508). In one or more embodiments, method 500 includes determining the first selected amount of force by accessing a lookup table (LUT) containing a plurality of first selected subsets associated with respective values of the one or more flight parameters. In certain instances, the first and second subsets are different to longitudinally compensate in pitch for the one or more flight parameters.

In one or more embodiments, method 500 includes selecting a sequential firing sequence of the first and second subset of the one or more gas-generating units to generate a time-varying amount of gas generated to stroke the first fluid-actuated ejector piston according to a motion profile (block 510). The motion profile can be based on the first selected amount of force such as to maintain a selected rate of acceleration of the first and second fluid-actuated ejector piston. The motion profile can also be selected to remain within a mechanical pressure limit as the piston is displaced.

Method 500 includes initiating a first selected subset that correspond to the first selected amount of force of a number of gas-generating units of a first SFGG (block 512). Method 500 includes initiating a second selected subset that correspond to the second selected amount of force of a number of gas-generating units of a second SFGG (block 514). Method 500 includes directing respectively gas generated by the initiated first and second selected subset of gas-generating units actuate to extend first and second fluid-actuated ejector pistons to cause a separation between the airborne store and the aircraft (block 516). Then method 500 ends.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An airborne support assembly comprising:
   a first ejector housing assembly coupled to a selected one of: (i) an airborne store; and (i) an aircraft;
   a first fluid-actuated ejector piston received for movement in the first ejector housing assembly and having a distal end abutting for contact the other one of: (i) the airborne store; and (ii) the aircraft;
   a first selectable force gas generator (SFGG) comprising more than one gas-generating unit in fluid communication with the first ejector housing assembly to actuate the first fluid-actuated ejector piston with a first selected amount of force to eject the airborne store;
   an initiator in communication with the first SFGG and that supplies at least one firing signal that causes a first selected subset of the more than one gas-generating unit that corresponds to the first selected amount of force;
   a first signal switching matrix that selectively communicatively couples the firing signal from the initiator to one or more of the more than one gas-generating unit;
   a device interface coupled to the initiator, the first signal switching matrix, and at least one sensor that dynamically detects one or more flight parameters of at least one of: (i) an attitude; (ii) a rate of motion; and (iii) a rate of acceleration of the aircraft and
   a controller in communication with the initiator, the first signal switching matrix, and the at least one sensor via the device interface to dynamically determine the first selected subset of the more than one gas-generating unit of the first SFGG based at least in part on the one or more flight parameters.

2. The airborne store support assembly of claim 1, further comprising:
   a second ejector housing assembly coupled to a selected one of: (i) the airborne store; and (i) the aircraft;
   a second fluid-actuated ejector piston received for movement in the second ejector housing assembly and having a distal end abutting for contact the other one of: (i) the airborne store; and (ii) the aircraft;
   a second SFGG comprising more than one gas-generating unit in fluid communication with the second ejector housing assembly to actuate the second fluid-actuated ejector piston with a second selected amount of force;
   the initiator in communication with the second SFGG and that supplies at least one firing signal that causes a second selected subset of the more than one gas-generating unit that corresponds to the second selected amount of force, a second signal switching matrix that selectively communicatively couples the firing signal from the initiator to one or more of the more than one gas-generating unit;
wherein the controller is in communication with the initiator, the second signal switching matrix, and sensor via the device interface to dynamically determine the second selected subset of the more than one gas-generating unit of the second SFGG based at least in part on the one or more flight parameters.

3. The airborne store assembly of claim 2, wherein the first and second subsets are different to longitudinally compensate in pitch for the one or more flight parameters.

4. The airborne store support assembly of claim 2, wherein each of the first and second SFGGs comprise:
a plurality of gas-generating propellant cells; an SFGG housing;
a honeycombed lattice structure contained by the SFGG housing that structurally position the plurality of gas-generating propellant cells;
one or pneumatic conduit that originate with each one of the plurality of gas-generating propellant cells and form a converged output conduit connectable for fluid communication with the respective ejector housing;
a first signal switching matrix that selectively communicatively couples a firing signal from the initiator to one or more of the more than one gas-generating unit.

5. The airborne store assembly of claim 1, wherein the one or more flight parameters comprise: (i) sensed gravitational acceleration along aircraft body longitudinal x-axis (gs(x)); (ii) sensed gravitational acceleration along aircraft body lateral y-axis (gs(y)); (iii) sensed gravitational acceleration along aircraft body vertical z-axis (gs(z)); (iv) static temperature)($T^o$); (v) pitch rate (Q); and (vi) angle of attack ($\alpha$).

6. The airborne store support assembly of claim 1, wherein the controller accesses a lookup table (LUT) containing a plurality of first selected subsets associated with respective values of the one or more flight parameters.

7. The airborne store support assembly of claim 1, wherein the controller causes the initiator and the first signal switching matrix to further sequentially fires the first subset of the more than one gas-generating unit to generate a time-varying amount of gas generated to stroke the first fluid-actuated ejector piston according to a motion profile based on the first selected amount of force.

8. The airborne store support assembly of claim 7, wherein the motion profile comprises maintaining a selected rate of acceleration of the first fluid-actuated ejector piston.

9. The airborne store support assembly of claim 1, wherein the first ejector housing and first SFGG are incorporated into the airborne store.

10. The airborne store support assembly of claim 1, further comprising an airborne store suspension apparatus engageably latched to support the airborne store prior to release and responsive to the at least one firing signal to disengage from the airborne store to enable positioning by the first fluid-actuated ejector piston during release.

11. The airborne store support assembly of claim 10, wherein the airborne store suspension apparatus comprises a bomb rack attached between the aircraft and the airborne store and contains the first ejector housing and first SFGG.

12. The airborne store support assembly of claim 10, wherein the first ejector housing and airborne store suspension apparatus are attached to a structural frame of the aircraft.

13. A method comprising:
dynamically detecting one or more flight parameters of at least one of: (i) an attitude; (ii) a rate of motion; and (iii) a rate of acceleration of an aircraft; and
in response to receiving at least one firing signal:
determining a first selected amount of force required at a first fluid-actuated ejector piston, received for movement in a first ejector housing, to separate an airborne store from the aircraft during release that compensates for the dynamically detected one or more flight parameters; and
initiating a first selected subset that correspond to the first selected amount of force of a number of more than one gas-generating unit of a first selectable force gas generator (SFGG), the initiated first selected subset of the more than one gas-generating unit actuating the first fluid-actuated ejector piston to cause a separation between the airborne store and the aircraft.

14. The method of claim 13, further comprising, in response to the at least one firing signal:
determining a second selected amount of force required from a second ejector piston that is longitudinally separated from the first ejector piston along a longitudinal axis of the airborne store to separate the airborne store from the aircraft during release that compensates for the dynamically detected one or more flight parameters; and
initiating a second selected subset that correspond to the second selected amount of force of a number of more than one gas-generating unit of a second SFGG, the initiated second selected subset of the more than one gas-generating unit actuating the second fluid-actuated ejector piston to cause a separation between the airborne store and the aircraft,
wherein the first and second subsets are different to longitudinally compensate in pitch for the one or more flight parameters.

15. The method of claim 13, wherein the one or more flight parameters comprise: (i) sensed gravitational acceleration along aircraft body longitudinal x-axis (gs(x)); (ii) sensed gravitational acceleration along aircraft body lateral y-axis (gs(y)); (iii) sensed gravitational acceleration along aircraft body vertical z-axis (gs(z)); (iv) static temperature) ($T^o$); (v) pitch rate (Q); and (vi) angle of attack ($\alpha$).

16. The method of claim 13, wherein determining the first selected amount of force comprises accessing a lookup table (LUT) containing a plurality of first selected subsets associated with respective values of the one or more flight parameters.

17. The method of claim 16, wherein the motion profile comprises maintaining a selected rate of acceleration of the first fluid-actuated ejector piston.

18. The method of claim 13, further comprising firing sequentially the first subset of the more than one gas-generating unit to generate a time-varying amount of gas generated to stroke the first fluid-actuated ejector piston according to a motion profile based on the first selected amount of force.

19. The method of claim 13, further comprising disengaging a latched airborne store suspension apparatus that supports the airborne store prior release in response to the at least one firing signal and prior to initiating the first subset.

* * * * *